United States Patent
Tran

(10) Patent No.: US 7,415,295 B2
(45) Date of Patent: *Aug. 19, 2008

(54) WIRELESS TELEPHONE ANTENNA DIVERSITY SYSTEM AND METHOD

(75) Inventor: Allen Tran, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 597 days.

This patent is subject to a terminal disclaimer.

(21) Appl. No.: 11/125,520

(22) Filed: May 9, 2005

(65) Prior Publication Data

US 2005/0200538 A1   Sep. 15, 2005

Related U.S. Application Data

(63) Continuation of application No. 10/407,606, filed on Apr. 3, 2003, now Pat. No. 6,924,766.

(51) Int. Cl.
*H04M 1/00* (2006.01)

(52) U.S. Cl. ............... 455/575.7; 455/101; 455/562.1; 343/853; 342/375

(58) Field of Classification Search ........... 455/101, 455/561, 562.1, 575.1, 575.5, 575.7; 343/702, 343/703, 786, 844, 853; 342/373–375
See application file for complete search history.

(56) References Cited

U.S. PATENT DOCUMENTS

| 7,183,984 | B2 * | 2/2007 | Jarmuszewski et al. ...... 343/702 |
| 2002/0149527 | A1 * | 10/2002 | Wen et al. ................... 343/727 |
| 2006/0017633 | A1 * | 1/2006 | Pronkine .................... 343/729 |

FOREIGN PATENT DOCUMENTS

WO    WO 01/71940 A2    9/2001

* cited by examiner

*Primary Examiner*—Edward Urban
*Assistant Examiner*—Nhan T. Le

(57) ABSTRACT

A system and method are provided for diversifying radiated electromagnetic communications in a wireless communication device having a plurality of embedded antennas. The method comprises sensing conducted electromagnetic transmission line signals communicated by the antennas, selecting between the antennas in response to sensing the transmission line signals, and modifying antenna electrical performance characteristics in response to sensing the transmission line signals. In some aspects sensing transmission line signals includes sensing transmission line signal power levels. For example, the power levels of the radiated signals conducted on the transmission lines can be sensed or the transmission line signal power levels of transmitted signals reflected by the antennas are sensed.

20 Claims, 4 Drawing Sheets

WIRELESS TELEPHONE ANTENNA DIVERSITY SYSTEM AND METHOD

CROSS-REFERENCE TO RELATED APPLICATIONS

This is a continuation application of application Ser. No. 10/407,606, filed Apr. 3, 2003 now U.S. Pat. No. 6,924,766, the disclosure of which is hereby incorporated by reference.

BACKGROUND OF THE INVENTION

1. Field of the Invention

This invention generally relates to wireless communication device antennas and, more particularly, to a system and method for using chassis-embedded antennas to diversify radiated electromagnetic signals communicated by a wireless communications device.

2. Description of Related Art

The size of portable wireless communications devices, such as telephones, continues to shrink, even as more functionality is added. As a result, the designers must increase the performance of components or device subsystems while reducing their size, or placing these components in less desirable locations. One such critical component is the wireless communications antenna. This antenna may be connected to a telephone transceiver, for example, or a global positioning system (GPS) receiver.

Wireless telephones can operate in a number of different frequency bands. In the US, the cellular band (AMPS), at around 850 megahertz (MHz), and the PCS (Personal Communication System) band, at around 1900 MHz, are used. Other frequency bands include the PCN (Personal Communication Network) at approximately 1800 MHz, the GSM system (Groupe Speciale Mobile) at approximately 900 MHz, and the JDC (Japanese Digital Cellular) at approximately 800 and 1500 MHz. Other bands of interest are GPS signals at approximately 1575 MHz and Bluetooth at approximately 2400 MHz.

Conventionally, good communication results have been achieved using a whip antenna. Using a wireless telephone as an example, it is typical to use a combination of a helical and a whip antenna. In the standby mode with the whip antenna withdrawn, the wireless device uses the stubby, lower gain helical coil to maintain control channel communications. When a traffic channel is initiated (the phone rings), the user has the option of extending the higher gain whip antenna. Some devices combine the helical and whip antennas. Other devices disconnect the helical antenna when the whip antenna is extended. However, the whip antenna increases the overall form factor of the wireless telephone.

It is known to use a portion of a circuitboard, such as a dc power bus, as an electromagnetic radiator. This solution eliminates the problem of an antenna extending from the chassis body. Printed circuitboard, or microstrip antennas can be formed exclusively for the purpose of electromagnetic communications. These antennas can provide relatively high performance in a small form factor.

Since not all users understand that an antenna whip must be extended for best performance, and because the whip creates an undesirable form factor, with a protrusion to catch in pockets or purses, chassis-embedded antenna styles are being investigated. That is, the antenna, whether it is a whip, patch, or a related modification, is formed in the chassis of the phone, or enclosed by the chassis. While this approach creates a desirable telephone form factor, the antenna becomes more susceptible to user manipulation and other user-induced loading effects. For example, an antenna that is tuned to operate in the bandwidth between 824 and 894 megahertz (MHz) while laying on a table, may be optimally tuned to operate between 790 and 830 MHz when it is held in a user's hand. Further, the tuning may depend upon the physical characteristics of the user and how the user chooses to hold and operate their phones. Thus, it may be impractical to factory tune a conventional chassis-embedded antenna to account for the effects of user manipulation.

It would be advantageous if a wireless communications device could sense degradations in the tuning of a chassis-embedded antenna, due to effect of user manipulation for example.

It would be advantageous if a wireless communications device used a system of chassis-embedded antennas to maximize antenna diversity.

It would be advantageous if the wireless communications device chassis-embedded antenna system could be modified to account for the effects of user manipulation or other antenna detuning mechanisms.

BRIEF SUMMARY OF THE INVENTION

The present invention describes a wireless communications device chassis-embedded antenna system and method for improving the diversity of radiated electromagnetic communications. Because chassis-embedded or internal antennas are more susceptible to degradation due to user manipulating, the system uses a plurality of antennas that can be selected in response to monitoring the quality of communications through each antenna.

Accordingly, a method is provided for diversifying radiated electromagnetic communications in a wireless communication device. The method comprises: mounting a first antenna and a second antenna internal to a wireless communication device chassis; sensing conducted electromagnetic transmission line signals communicated by the first and second antennas; and, selecting between the first and second antennas in response to sensing the transmission line signals. In some aspects of the method, a single antenna is not selected, but rather, the first and second antennas are combined.

In some aspects of the method, sensing transmission line signals includes sensing transmission line signal power levels. For example, the transmission line signal power levels of transmitted signals reflected by the antennas are sensed. In other aspects, sensing transmission line signals includes sensing the radiated signals received at the first and second antennas and conducted on the transmission line. For example, the power levels of the radiated signals conducted on the transmission lines can be sensed. Then, antenna selection is responsive to the radiated signal transmission line signal power levels. Alternately, the radiated signals are received and decoded. Then, the antenna supplying the transmission line signal with the fewest number of decoding errors is selected.

Other aspects of the method comprise: communicating radiated electromagnetic signals through the first antenna at a first operating frequency; and, communicating radiated electromagnetic signals through the second antenna at the first operating frequency. In one aspect, the first and second antennas are separated by an effective distance of about a quarter-wavelength of the first operating frequency, to create spatial diversity. In other aspects, the first antenna radiates in a first polarized radiation pattern and the second antenna radiates in a second polarized radiation pattern, orthogonal to the first polarized radiation pattern.

Additional details of the above-described method and a wireless telephone antenna diversity system are provided in more detail below.

DETAILED DESCRIPTION OF THE INVENTION

Figure 1:
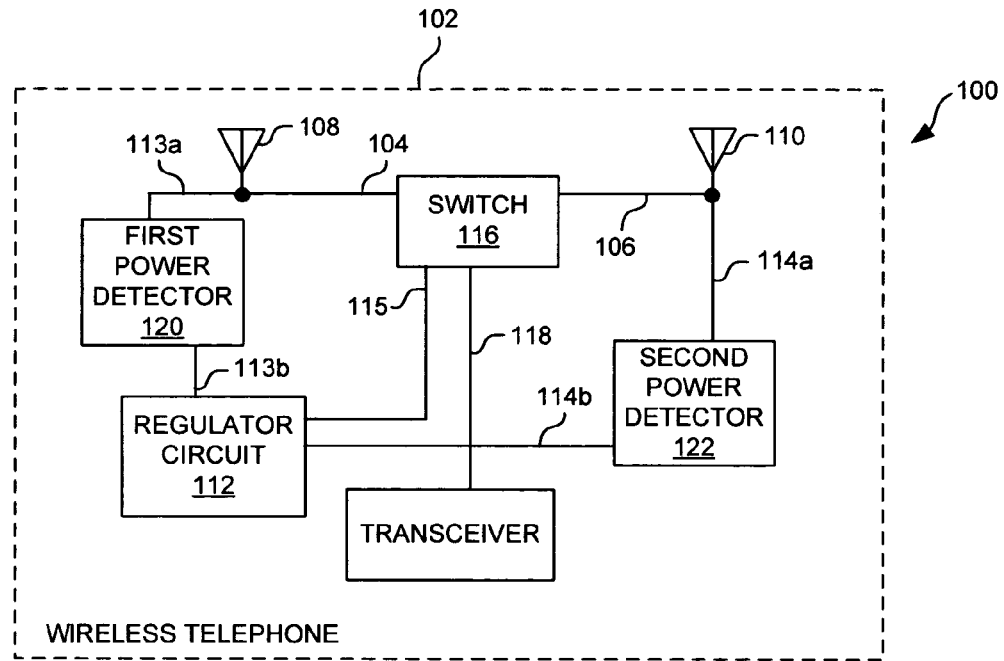
FIG. 1 is a schematic block diagram of the present invention wireless telephone antenna diversity system.

FIG. 1 is a schematic block diagram of the present invention wireless telephone antenna diversity system. The system 100 comprises a chassis 102 (represented as a dotted line), a first transmission line 104, a second transmission line 106, and a first antenna 108 mounted internal to the chassis 102 with a transmission line port connected to the first transmission line 104. A second antenna 110 is mounted internal to the chassis 102 with a transmission line port connected to the second transmission line 106.

A regulator circuit 112 has an input operatively connected to the first transmission line 104 on line 113 and an input operatively connected to the second transmission line 106 on line 114. As used herein, the phrase "operatively connected" means indirectly connected or connected through an intervening element. The regulator circuit 112 has an output on line 115 to supply control signals responsive to conducted electromagnetic transmission line signals on the first and second transmission lines 104/106. A switch 116 has a transceiver connection port on line 118, a port connected to the first transmission line 104, a port connected to the second transmission line 106, and an input to accept control signals from the regulator circuit on line 115. The switch 116 selectively connects the transceiver port on line 118 to the first and second transmission lines 104/106 in response to the control signals on line 115.

In one aspect of the system 100, the switch 116 is literally a switch that permits a transceiver to be connected to one of the antennas. In other aspects of the system 100, the switch also acts as a combiner. That is, the switch 116 can combine (signals to and from) the first and second transmission ports, and connect the combined ports to the transceiver port in response to control signals on line 115. For example, the switch 116 can incorporate a conventional 3 dB splitter.

Generally, the regulator circuit 112 supplies control signals on line 115 responsive to transmission line signal power levels conducted on the first and second transmission lines 104/106. In one aspect of the system 100, the regulator circuit 112 supplies control signals on line 115 that are responsive to transmission line signal power levels reflected from the first antenna port and the second antenna port. That is, the regulator circuit 112 selects an antenna in response to measuring antenna mismatch. The antenna mismatch may be responsive to user hand effects and/or the relationship between the transmission frequency and the optimal tuning range of the antenna.

Alternately, antenna selection decisions can be based upon the strength of the signals that are received on the antennas 108/110. That is, the first antenna 108 receives radiated signals and supplies conducted transmission line signals on the first transmission line 104. The second antenna 110 receives radiated signals and supplies conducted transmission line signals on the second transmission line 106. Then, the system 100 would further comprise a first power detector 120 having an input operatively connected to the first transmission line 104 on line 113a and an output connected to the regulator circuit 112 on 113b to supply transmission line signal power levels. Likewise, a second power detector 122 would have an input operatively connected to the second transmission line 106 on line 114a and an output connected to the regulator circuit 112 on 114b to supply transmission line signal power levels. Alternately but not shown, a single power detector interposed between the switch and the transceiver could be multiplexed to sample the signals on the two transmission lines. Either way, the regulator circuit 112 supplies control signals on line 115 that are responsive to the first and second transmission line detected signal power levels.

Figure 2:
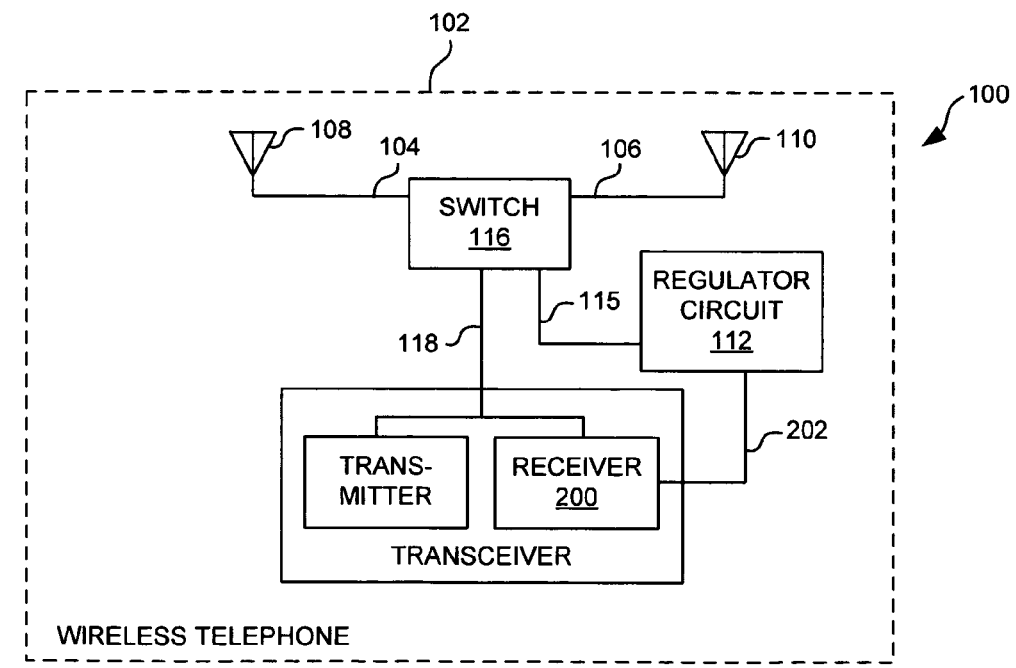
FIG. 2 is a schematic block diagram illustrating a variation of the present invention system of FIG. 1.

FIG. 2 is a schematic block diagram illustrating a variation of the present invention system 100 of FIG. 1. As above, the first antenna 108 receives radiated signals and supplies conducted transmission line signals on the first transmission line 104. The second antenna 110 receives radiated signals and supplies conducted transmission line signals on the second transmission line 106. A receiver 200 has an input connected to the switch transceiver port on line 118 to receive and decode the transmission line signals. The receiver 200 has an output on line 202 connected to the regulator circuit 112 to supply decoded signal error signals corresponding to each antenna. Then, the regulator circuit 112 supplies control signals on line 115 that are responsive to the decoded error signals for each antenna.

Note that system of FIG. 2 does not exclude any particular modulation scheme or coding format. Further, the system 100 can be used with modulation schemes that use forward error correction (FEC) schemes. In other aspect of the system 100, the antenna selections are made by a communication partner, a wireless telephone base station for example. Then, the regulator circuit makes antenna selection decisions in response to commands that are received by receiver 200.

With respect to either FIG. 1 or FIG. 2, the first antenna 108 includes an active element with a first electric length and the second antenna 110 includes an active element with a second electrical length. Note that the first and second electrical lengths may be the same, to communicate at the same frequency. In other aspects, the electrical length may be different to communicate at different frequencies, or slightly offset, to communicate at different ends of a frequency bandwidth. The active element is defined by the antenna style. For example, a dipole antenna will have a radiator and a counterpoise, typically with effective electrical lengths that are each an effective quarter-wavelength multiple of the operating frequency. The electrical lengths are dependent upon the proximate dielectric material, as the wavelength of a conducted signal varies with the conducting medium. A monopole antenna will have a groundplane counterpoise and a radiator with an effective electrical length that is an effective quarter-wavelength multiple of the operating frequency. The present invention system 100 can be enabled with any convention antenna that meets the form factor of the chassis 102, and the present invention is not limited to any particular antenna style.

Figure 3:
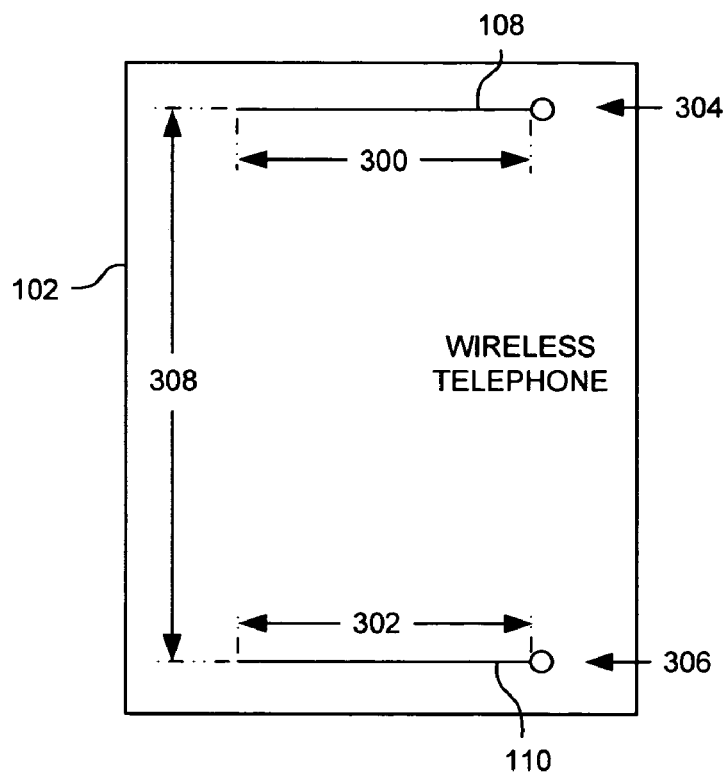
FIG. 3 is a drawing showing an exemplary antenna mounting arrangement, featuring antenna spatial diversity.

FIG. 3 is a drawing showing an exemplary antenna mounting arrangement, featuring antenna spatial diversity. In some aspects, the first antenna 108 has a first operating frequency responsive to the first electrical length 300 and the second antenna 110 has a first operating frequency responsive to the second electrical length 302 being equal to the first electrical length 300. The chassis 102 has a first position 304 for mounting the first antenna 108 and a second position 306 for mounting the second antenna 110. The first and second positions 304/306 being separated by an effective distance 308 of about a quarter-wavelength of the first operating frequency.

Figure 4:
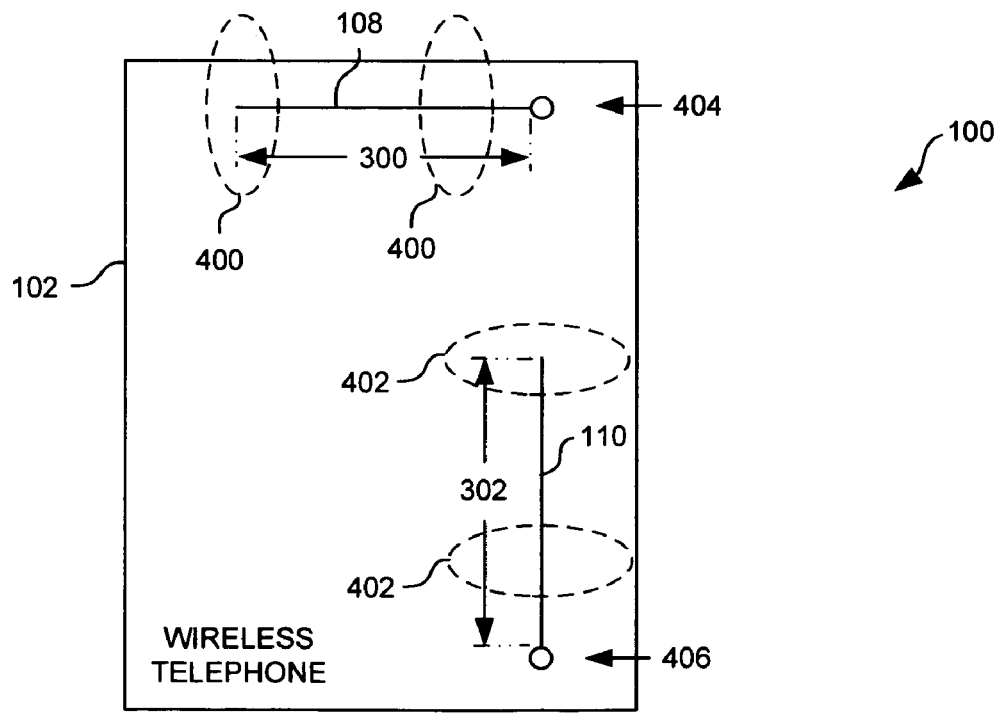
FIG. 4 is a drawing showing an exemplary antenna mounting arrangement, featuring antenna polarity diversity.

FIG. 4 is a drawing showing an exemplary antenna mounting arrangement, featuring antenna polarity diversity. The first antenna 108 has a first operating frequency responsive to the first electrical length 300 and a first polarized radiation pattern represented by reference designator 400. The second antenna 110 has a first operating frequency responsive to the second electrical length 302 being equal to the first electrical length 302, and a second polarized radiation pattern represented by reference designator 402. The chassis 102 has a first position 404 for mounting the first antenna 108 and a second position 406 for mounting the second antenna 110. The first polarized radiation pattern 400 is orthogonal to the second polarized radiation pattern 402. Note that the polarization patterns need not orthogonal, but orthogonality typically results in better diversity. It should also be noted that the polarization pattern is dependent upon the style of the antenna as well as the placement of the antenna in the chassis.

Figure 5:
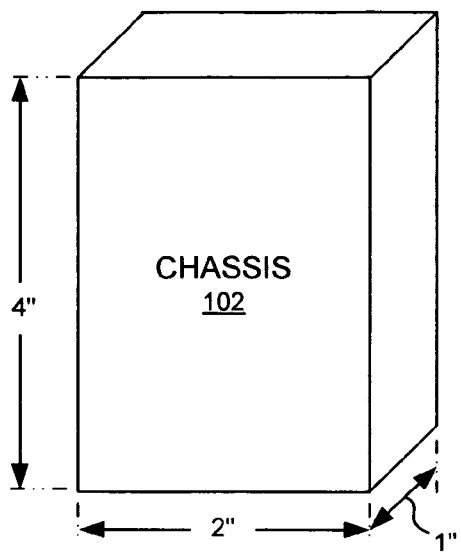
FIG. 5 is a drawing illustrating the physical dimensions of the chassis of FIGS. 1 through 4.

FIG. 5 is a drawing illustrating the physical dimensions of the chassis 102 of FIGS. 1 through 4. The chassis has a size of 4 inches (length), by 2 inches (width), by one inch (thickness), or less (in any of the above-mentioned dimensions). Alternately stated, the chassis 102 has a volume of 8 cubic inches, or less. Although depicted as having a brick-like shape, it should be noted that the present invention is not limited to any particular shape. It should also be noted that even a brick-shaped chassis will have variations to accommodate features such as internal components, handgrip, display, keypad, and external accessories. The present invention system can also be enabled in these modified brick-shaped packages.

Figure 6:
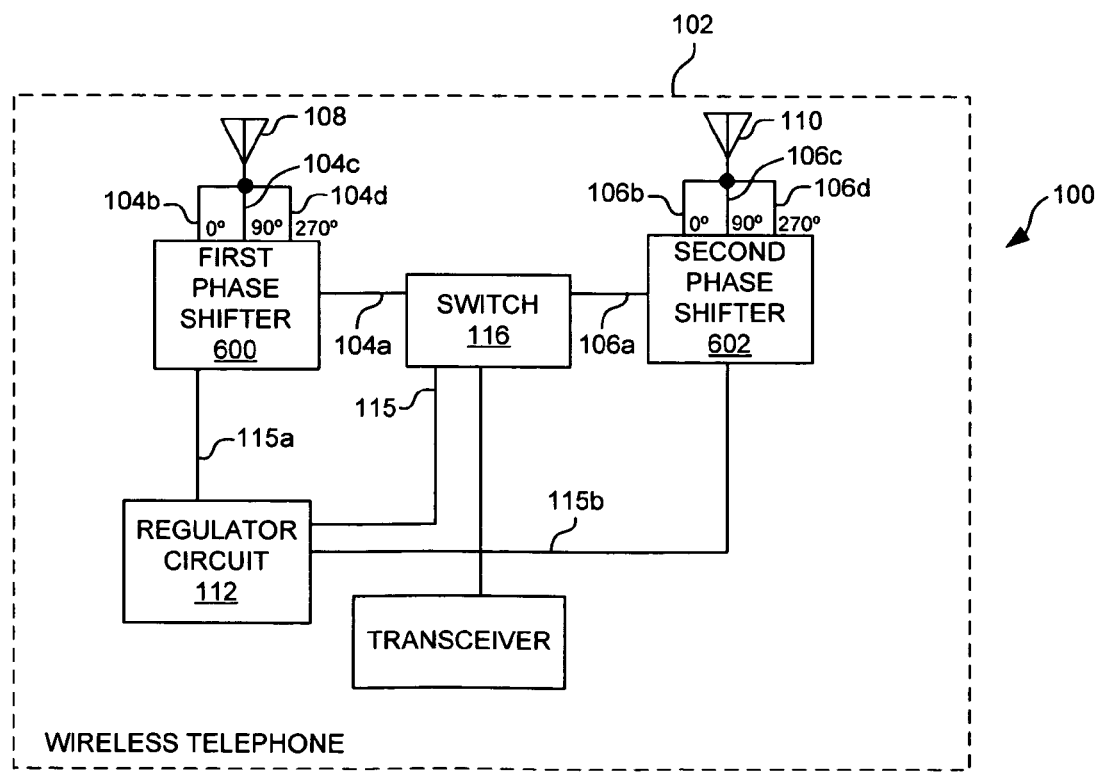
FIG. 6 is a schematic block diagram illustrating a phase shift variation of the present invention system.

FIG. 6 is a schematic block diagram illustrating a phase shift variation of the present invention system. A first phase shifter 600 is shown having an input connected to the first transmission line port of the switch 116 on line 104a and an input on line 115a to accept control signals from the regulator circuit 112. The first phase shifter 600 has a plurality of through-signal phase differentiated outputs selectively connected to the first antenna transmission line port in response to the control signals. As shown, the first phase shifter includes three phase-differentiated outputs on lines 104b, 104c, and 104d, separated by approximately 90 degrees. The word "approximately" is used because of fabrication tolerances, which will vary for different manufacturers, and the fact that the frequencies of interest are typically a band of frequencies, as opposed to a single frequency. The present invention is not limited to any particular number of phase shifter outputs or any particular differentiation in phase.

Likewise, a second phase shifter 602 has an input connected to the second transmission line port of the switch and an input on line 115b to accept control signals from the regulator circuit 112. The second phase shifter 602 also has a plurality of through-signal phase-differentiated outputs selectively connected to the second antenna 110 transmission line port in response to the control signals. Again, three phase-differentiated outputs 106b, 106c, and 106d are shown as an example, separated by approximately 90 degrees.

The present invention system 100 can use the phase shifters 600 and 602 to improve communications being received on either a single, switched antenna, or communications being received combined on antennas. For example, the phase can be selected in response to minimizing decoding errors (FIG. 2) or maximizing received signal power (FIG. 1). Although not specifically shown, the system 100 could also be enabled with just a single phase shifter interposed between the switch and the transceiver. Such as variation would be more effective when the antennas are switched, as opposed to combined.

Figure 7:
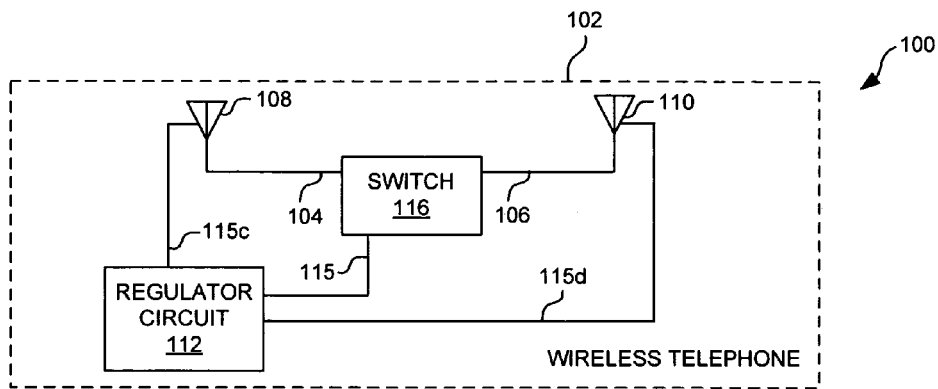
FIG. 7 is a schematic block diagram illustrating an antenna electrical length variation of the present invention system.

FIG. 7 is a schematic block diagram illustrating an antenna electrical length variation of the present invention system. The system 100 comprises a first antenna 108 having an input on line 115c to accept control signals, and an active element electrical length responsive to the control signals. Likewise, the second antenna 110 has an input on line 115d to accept control signals, and an active element electrical length responsive to the control signals. The regulator circuit 112 has outputs connected to the first and second antennas on line 115c and 115d, respectively, to supply control signals in response to transmission line signals on the first and second transmission line. As above, the regulator circuit can be responsive to power reflected by the antenna, received signal strength, of decoded error rates. Also as above, this variation of the system may further incorporate phase shifting elements.

The electrical length of many different antenna styles can be modified by using a microelectromechanical switches (MEMSs) to change the physical length of an active element, such as a radiator, or by using a ferroelectric material to change to dielectric constant proximate to an active element. However, the present invention is not limited to any particular active element electrical length modification means. Additional details of the above-described MEMS and ferroelectric antennas can be found in U.S. Pat. App. No. 2004/0246189 (Tran), which is incorporated herein by reference.

Although not specifically shown, from the figures and the above descriptions it can be extrapolated that the present invention may comprise a plurality of transmission lines and a plurality of antennas internally mounted to the chassis, each with a transmission line port connected to a corresponding one of the plurality of transmission lines. Then, the regulator circuit has inputs operatively connected to each of the plurality of transmission lines. The switch, likewise, has ports connected to each of the plurality of antennas to selectively connect the plurality of antennas to the transceiver port in response to control signals from the regulator circuit. As above, the regulator circuit can be responsive to power reflected by the antenna, received signal strength, of decoded error rates. Also as above, this variation of the system may further incorporate phase shifting elements and/or antennas with electrical lengths that can be modified.

Figure 8:
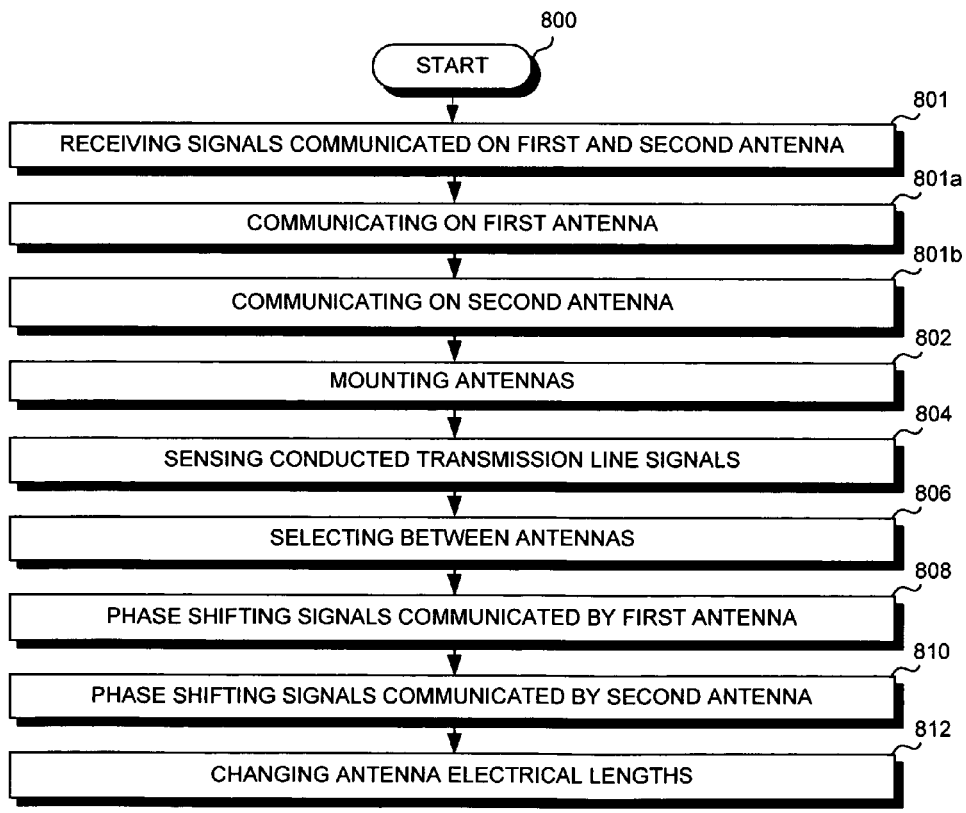
FIG. 8 is a flowchart illustrating the present invention method for diversifying radiated electromagnetic communications in a wireless telephone device.

FIG. 8 is a flowchart illustrating the present invention method for diversifying radiated electromagnetic communications in a wireless telephone device. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 800.

Step 802 mounts a first antenna and a second antenna internal to a wireless telephone device chassis. Step 804 senses conducted electromagnetic transmission line signals communicated by the first and second antennas. Step 806 selects between the first and second antennas in response to sensing the transmission line signals. In some aspects, selecting between the first and second antennas in Step 806 includes combining the first and second antennas.

In some aspects of the method, sensing transmission line signals in Step 804 includes sensing transmission line signal power levels. In some aspects, Step 804 senses the transmission line signal power levels of transmitted signals reflected by the antennas.

Some aspects of the method comprise a further step. Step 801 receives radiated signals communicated on the first and second antennas. Then, sensing transmission line signals in Step 804 includes sensing the radiated signals received at the first and second antennas and conducted on the transmission line.

In one variation, Step 804 senses the power levels of the radiated signals conducted on the transmission lines. Then, selecting between the first and second antennas in response to sensing the transmission line signals in Step 806 includes selecting the antenna in response to the radiated signal transmission line power levels.

In another variation, sensing the radiated signals conducted on the transmission line in Step 804 includes receiving and decoding the radiated signals. Then, selecting between the first and second antennas in response to sensing the transmission line signals in Step 806 includes selecting the antenna supplying the transmission line signal with the fewest number of decoded errors.

In some aspects, Step 801a communicates radiated electromagnetic signals through the first antenna at a first operating frequency. Step 801b communicates radiated electromagnetic signals through the second antenna at the first operating frequency. Then, mounting the first and second antennas internal to a wireless telephone chassis in Step 802 includes separating the first and second antennas by an effective distance of about a quarter-wavelength of the first operating frequency. The word "about" is used because of fabrication tolerances inherent in building an electrical device, variations in electrical path due to the shape of the proximate dielectric, and the fact that communications are typically conducted across a band of frequencies, where only a portion of the band can be at a perfect quarter-wavelength relationship. It should be understood that the phase "effective distance" means the distance between antennas that takes into account the effect of the intervening material dielectric constant. In another aspect, Step 801b communicates radiated electromagnetic signals through the second antenna at a second operating frequency, different than the first operating frequency.

In other aspects, communicating radiated electromagnetic signals through the first antenna at a first operating frequency in Step 801a includes radiating in a first polarized radiation pattern. Communicating radiated electromagnetic signals through the second antenna at the first operating frequency in Step 801b includes radiating in a second polarized radiation pattern, orthogonal to the first polarized radiation pattern.

In some aspects of the method, mounting the first and second antennas internal to a wireless telephone device chassis in Step 802 includes mounting the first antenna and the second antenna in a chassis having the dimensions of 4 inches, by 2 inches, by 1 inch, or less.

Some aspects of the method include further steps. Step 808 phase shifts the transmission line signals communicated by a first antenna in response to sensing the transmission line signals. Step 810 phase shifts the transmission line signals communicated by a second antenna in response to sensing the transmission line signals. Another aspect of the method includes yet a further step that may, or may not be combined with Steps 808 and 810. Step 812 changes the electrical length of the first and second antennas in response to sensing the transmission line signals.

In some aspects, mounting a first antenna and a second antenna internal to a wireless telephone device chassis in Step 802 includes mounting a plurality of antennas internal to the chassis. Sensing conducted electromagnetic transmission line signals communicated by the first and second antennas in Step 804 includes sensing transmission line signals communicated by the plurality of antennas. Then, selecting between the first and second antennas in Step 806 includes selecting between the plurality of antennas in response to sensing between the plurality of transmission line signals.

A system and method has been provided for diversifying radiated electromagnetic communications through the use of selectively connected chassis-embedded antennas. Although the invention has been presented in the context of a wireless telephone, it should be understood that the invention has wider application. Further, although specific arrangements of antennas, switches, phase shifting, and regulating circuitry has been presented, it should be understood that alternate arrangements and combinations of the circuitry could be used to enable the invention. Other variations and embodiments of the invention will occur to those skilled in the art.

I claim:

1. A wireless communication device antenna diversity system, the system comprising:
   a chassis;
   a transceiver;
   a first transmission line;
   a second transmission line;
   a first antenna embedded in the chassis, and operatively connected to the first transmission line;
   a second antenna. embedded in the chassis, and operatively connected to the second transmission line;
   a regulator circuit comprising an input operatively connected to the first transmission line, an input operatively connected to the second transmission line, and an output to supply control signals responsive to conducted electromagnetic transmission line signals on the first and second transmission lines;
   a switch operatively connected to the transceiver, the first transmission line, and the second transmission line, and having an input to receive control signals from the regulator circuit, the switch selectively connecting the transceiver to at least one of the first and second transmission lines in response to the control signals; and,
   a correction circuit operatively connected to at least one of the first and second antennas, and operatively connected to at least one of the first and second transmission lines, wherein the correction circuit comprises an input to receive control signals from the regulator circuit, and is configured to modify electrical performance characteristics of at least one of the first and second antennas in response to the control signals.

2. The system of claim 1 wherein the regulator circuit supplies control signals responsive to transmission line signal power levels reflected from the first antenna and the second antenna.

3. The system of claim 2 further comprising an antenna mismatch detector; and
   wherein the regulator circuit further comprises an input operatively connected to the mismatch detector, the mismatch detector detecting transmission line signal power levels reflected from the first antenna and the second antenna.

4. The system of claim 1 wherein the regulator circuit is configured to receive radiated signals communicated on the first and second antennas, decode the received signals, and determine which of the decoded received signals has the fewest number of decoding errors.

5. The system of claim 1 Wherein the correction circuit further comprises
- a first phase shifter, situated along the first transmission line, comprising an input to receive control signals from the regulator circuit, and a plurality of through-signal phase differentiated outputs selectively connected to the first antenna in response to the control signals; and,
- a second phase shifter, situated along the second transmission line, comprising an input to receive control signals from the regulator circuit, and a plurality of through-signal phase differentiated outputs selectively connected to the second antenna in response to the control signals.

6. The system of claim 5 wherein the regulator circuit is configured to receive radiated signals communicated on the first and second antennas, decode the received signals, and determine which of the decoded received signals has the fewest number of decoding errors; and
- wherein the correction circuit is configured to select a phase that minimizes decoding errors.

7. The, system of claim 5 wherein the regulator circuit is configured to detect power of received radiated signals communicated on the first and second transmission lines; and
- wherein the correction circuit is configured to select a phase that maximizes received signal power.

8. The system of claim 1 wherein the first antenna comprises a first active element with a first electric length; and the second antenna comprises a second active element with a second electrical length; and
- wherein the correction circuit is configured to modify at least one of the first and second. electrical lengths.

9. The system of claim 8 wherein the correction circuit further comprises at least one microelectromechanical switch configured to change the physical length of an active element of at least one of the first and second antennas.

10. The system of claim 8 wherein the correct circuit further comprises a first ferroelectric material proximate to: the first active element and a second ferroelectric material proximate to the. second active element, and wherein the correction circuit is further configured to change the dielectric constant at least one of the first and second ferroelectric materials.

11. A method for managing electromagnetic communications in a wireless communication device having at least a first antenna and a second antenna embedded in the device, the method comprising:
- sensing conducted electromagnetic transmission line signals communicated by the first and second antennas;
- selecting between the, first and second antennas in response to the sensing conducted electromagnetic transmission line signals; and,
- modifying electrical performance characteristics of at least one of the first and second antennas in response to the sensing conducted electromagnetic transmission line signals.

12. The method of claim 11 wherein the sensing conducted electromagnetic transmission line signals communicated by the first and second antennas comprises sensing the transmission line power levels of transmitted signals reflected by the antennas.

13. The method of claim 12 wherein the sensing conducted electromagnetic transmission line signals communicated by the first and second. antennas comprises measuring antenna mismatch.

14. The method of claim 11 the sensing conducted electromagnetic transmission line signals comprises:
- receiving radiated signals communicated on the first and second antennas,
- decoding the received signals, and,
- determining which of the decoded received signals has the fewest number of decoding errors.

15. The method of claim 11 wherein the modifying electrical performance of at least one of the first and second antennas comprises at least one of:
- phase shifting the conducted electromagnetic transmission line signals communicated by the first antenna in response to the sensing conducted electromagnetic transmission line signals; and,
- phase shifting conducted electromagnetic transmission line signals communicated by the second antenna, in response to the sensing conducted electromagnetic transmission line signals.

16. The methods of claim 15 wherein the sensing conducted electromagnetic transmission line signals comprises:
- receiving radiated signals communicated on the first and second antennas,
- decoding the received signals, and,
- determining Which of the decoded received signals has the fewest number of decoding errors;
- wherein the phase shifting the conducted electromagnetic transmission line signals communicated by at least one of the first and second antennas comprises selecting a phase that minimizes decoding errors.

17. The method of claim 15 wherein the sensing conducted electromagnetic transmission line signals comprises detecting power of received radiated signals communicated on the first and second antennas; and,
- wherein the phase shifting the conducted electromagnetic transmission line signals communicated by at least one of the first and second comprises selecting a phase that maximizes power of received radiated signals.

18. The method of claim 11 wherein the modifying electrical performance of at least one of the first and second antennas comprises changing the antenna electrical length performance of the at least one of the first and second antennas in response to the sensing conducted electromagnetic transmission line signals communicated by the first and second antennas.

19. The method of 18 wherein the changing the antenna electrical length comprises changing the physical length of an active element of at least one of the first and second antennas via microelectromechanical switching.

20. The method of claim 18 wherein .the changing the antenna electrical length comprises changing. the dielectric constant of a ferroelectric material proximate to an active element of at least one of the first and second antennas.

* * * * *